May 8, 1923.
W. H. SMITH
STOP AND WASTE VALVE
Filed April 23, 1920
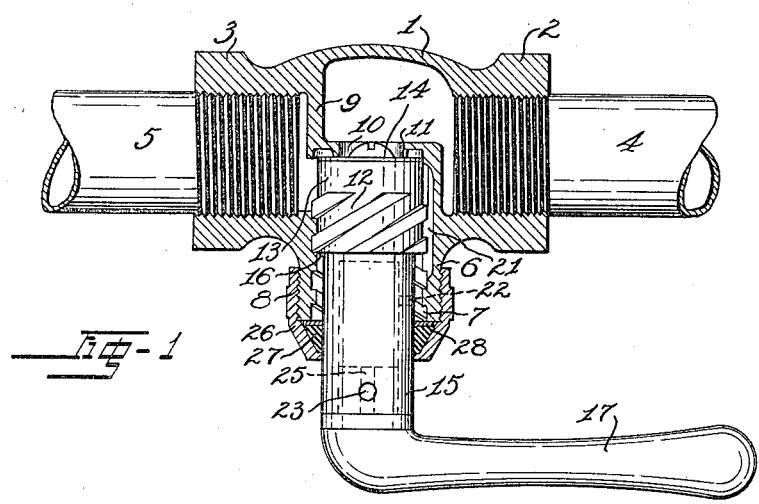
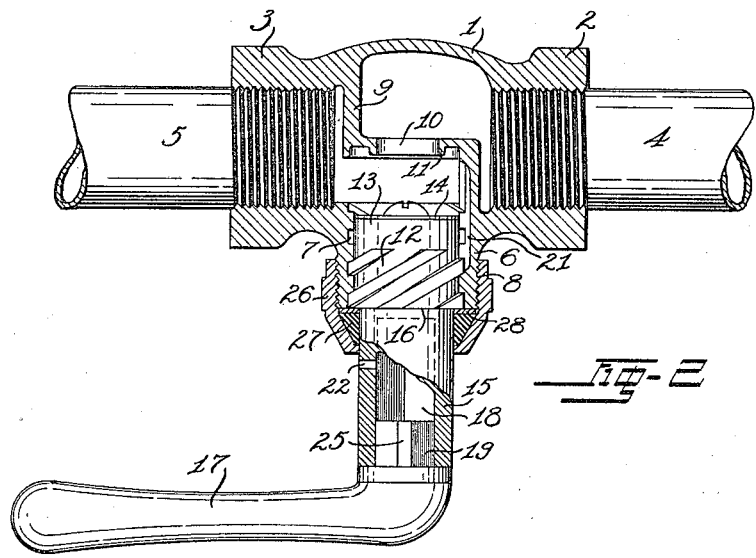
Inventor
William H. Smith
By Hull Smith Brock & West
Attys Patented May 8, 1923.

1,454,415

UNITED STATES PATENT OFFICE.

WILLIAM H. SMITH, OF EAST CLEVELAND, OHIO.

STOP AND WASTE VALVE.

Application filed April 23, 1920. Serial No. 375,937.

*To all whom it may concern:*

Be it known that I, WILLIAM H. SMITH, a citizen of the United States, residing at East Cleveland, in the county of Cuyahoga and State of Ohio, have invented a certain new and useful Improvement in Stop and Waste Valves, of which the following is a full, clear, and exact description, reference being had to the accompanying drawings.

This invention relates to valves and more particularly to stop or waste valves of the compression type.

Some of the objects of the present invention are to provide an exceptionally quick acting valve capable of opening or closing by 180° rotation of the valve stem and which automatically opens the waste outlet when the valve is closed and closes said outlet when the valve is open; to provide a valve which shall be simple in construction and inexpensive to manufacture; while further objects and advantages will appear as the description proceeds.

In the accompanying drawing wherein I have shown an illustrative embodiment of my invention but without intent to limit myself thereto, Fig. 1 is a longitudinal sectional view of my improved valve shown in the closed position; and Fig. 2 is a similar view but showing the valve in the open position.

Describing the parts by reference characters, my improved valve comprises a casing 1 having an inlet nipple 2 and an outlet nipple 3 adapted for the reception of suitable pipes such as shown at 4 and 5, respectively. This casing is formed with a laterally projecting cylindrical barrel 6 having a quick acting internal screw thread 7 and an external screw thread 8. The internal thread 7 is preferably a four pitch thread so that the valve will move from closed position to maximum open position by 180° rotation thereof, the purpose of this will become apparent as the description proceeds. Inside the casing 1 is formed a partition 9 having therein an aperture 10 surrounded by a valve seat 11 which is perpendicular to and coaxial with the barrel 6.

Located inside the barrel is a movable valve member which comprises an externally threaded portion 12 meshing with the threads 7 and an axial extension at each end, one of the extensions, 13, being formed with a seat engaging portion 14, and the other extension, 15, being cylindrical in shape and of a size smaller than the bottom of the threaded portion 12 whereby there is produced an abrupt shoulder 16. Secured to the projection 15 is the operating handle 17, said handle and projection being formed, the latter with a prismatic socket 18 and the former with a prismatic shank 19 adapted to enter said socket, and be secured therein by a set screw (not shown).

A vertical by-pass channel 21 is disposed on the inner side of the barrel 6 and is of sufficient length to extend from the valve seat 11 to a point beyond the externally threaded portion 12 of the valve member, when said valve is in the closed position as shown in Fig. 1. The prismatic socket 18 is of sufficient depth to extend inwardly to a point substantially adjacent the shoulder 16 and an aperture 22 affords communication between said socket and the by-pass channel 21. An aperture 23 is located at the outer end of the projection 15 and communicates with the socket and the atmosphere. The shank 19 on handle 17 is formed with opposed flat portions 25—25 to permit such communication on the one side of said shank and on the other to form an abutment for the set screw previously mentioned.

The usual gland nut 26 is threaded on the barrel 6 and embraces the projection 15 with suitable packing material 27 and a washer 28 to prevent leakage.

When the valve is in the closed position as shown in Fig. 1 it will be observed that the pipe line 5 is drained through the by-pass 21, aperture 22, socket 18, and aperture 23 to the atmosphere but when the valve is open as shown in Fig. 2 the apertures 22 and 23 are exterior of the valve 6 and the by-pass accordingly closed.

Having thus described my invention, what I claim is:

1. A valve comprising a casing, a partition wall in said casing having an aperture therein, a member movable toward and from said aperture to open and close the same, a reduced projection on said member extending exteriorly of said casing, a socket formed in said projection, an aperture adjacent the outer end of said socket communicating with the atmosphere, a second aperture adjacent the inner end of said socket communicating with a by-pass about said member when the valve is in the closed position and a packing ring clamped around said projection, both said apertures being exterior of said packing ring when said valve is in the open position.

2. A valve comprising a casing, a partition wall in said casing having an aperture therein, a rotatable member movable toward and from said aperture to open and close the same in 180° rotation thereof, a socket of comparatively large cross section formed along the longitudinal axis of said member, an aperture of comparatively small cross section at each end of said socket, said apertures being in communication one with one side of said partition and the other with the exterior of the casing when said valve is in the closed position, and both being exterior of said casing when said valve is in the open position.

3. A valve comprising a casing having an internally threaded neck, a partition wall in said casing having an aperture in line with said neck, a valve member threaded in said neck and movable toward and from said aperture to open and close the same, said member having a hollow stem, an apertured plate surrounding said stem and resting on said neck, a packing ring on said plate, a gland nut secured on the exterior of said neck and pressing on said packing, said stem having an aperture adjacent its outer end communicating with the atmosphere and a second aperture adjacent its inner end, a by-pass communicating with said inner aperture and one side of said partition when said valve is in closed position, both said apertures being exterior of said packing when said valve is in the open position.

In testimony whereof, I hereunto affix my signature.

WILLIAM H. SMITH.